Patented July 7, 1931

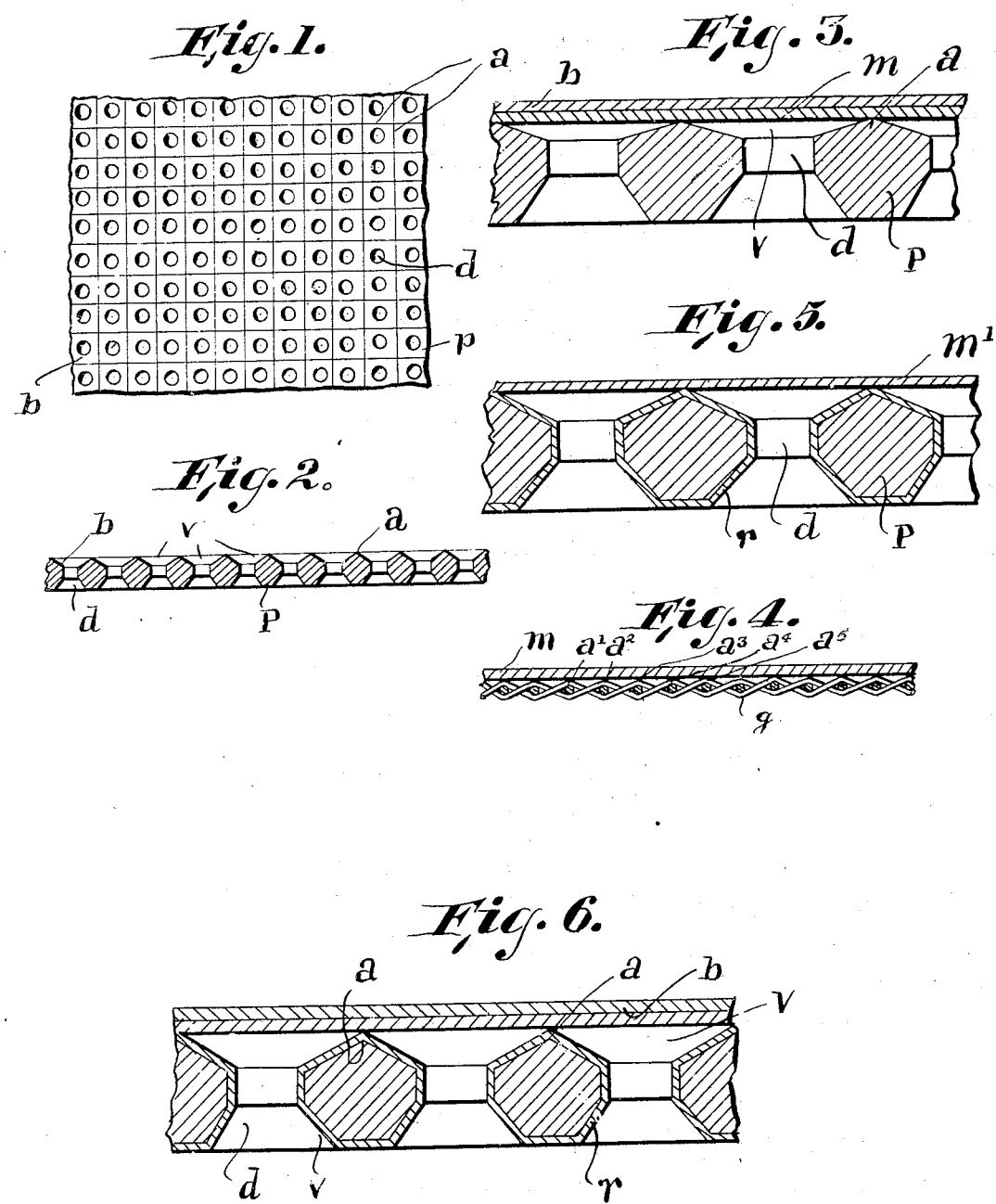

1,813,855

UNITED STATES PATENT OFFICE

ERNST KLAR, OF BERLIN, GERMANY, ASSIGNOR, BY MESNE ASSIGNMENTS, TO UNITED REPRODUCERS PATENTS CORPORATION, A CORPORATION OF NEVADA

ELECTROSTATICAL VIBRATION STRUCTURE

Application filed May 21, 1927, Serial No. 193,217, and in Germany May 21, 1926. Renewed November 14, 1930.

This invention relates to electrostatical vibration structures.

It is known in the case of electrostatical telephones to employ a fixed conductor plate which is situated opposite an elastic membrane. It is also old to provide between the membrane and the plate insulating means assisting to form a spacing.

At the same time it is essential that the air situated between the membrane and the plate should not be subjected by the vibrations of the membrane to any pressure which might act in a deadening sense, and for this reason it has already been proposed to furnish the plate with a series of perforations.

This measure, however, does not sufficiently ensure full possibility of vibration on the part of the membrane. In view of the weakness of the attractive forces, friction and any deadening action to which the membrane may be subjected by reason of the plate require to be diminished to a minimum extent. The deadening action is particularly noticeable in the case of reproduction of the human voice, or of music, and hissing noises occur to a greater or lesser degree which render the reproduction indistinct.

According to the invention, the membrane is furnished with a friction area which is as small as possible in relation to the plate, and this is accomplished by the fact that the said plate is neither entirely flat nor curved, but is furnished with weak depressions or cavities opening out into borings. These cavities may be slightly concave, and possess round or angular bases.

The invention is illustrated by way of example in the accompanying drawings, in which Fig. 1 shows in plan a possible form of embodiment for the surface of the plate.

Fig. 2 is a sectional view of the plate shown in Fig. 1.

Fig. 3 shows the plate on enlarged scale with the membrane resting thereon, whilst Fig. 4 shows an alternative form of embodiment.

Fig. 5 shows still another form of my invention and Fig. 6 is a sectional view of still another form.

Referring to the drawing, $b$ indicates the cavities in the plate $p$, $a$ being the rectangular ribs thus formed, on which the membrane rests. $d$ designates the openings allowing the passage of the air.

Fig. 3, which is drawn on larger scale, shows the plate $p$ with the membrane $m$ situated thereon, $l$ designating the conductive coating.

The membrane $m$ rests normally on the ribs $a$ and only when the electrostatic forces commence to act is the same drawn into the flat depressions $b$.

The area of attraction may also be coated with a dielectric $r$, as shown in Fig. 6, and in this case the membrane may consist wholly of conductive material as shown in Fig. 5, or the conductive coating may be turned towards the plate.

In place of a massive plate it is also possible to employ a wire net-work or fabric structure. This material having little inner strength then requires to be held taut in a strong ring. As disclosed by the diagrammatical illustration in Fig. 4, the membrane $m$ rests in this case against the knots or crossing points of the longitudinal and traverse wires of the structure $g$. These resting points, which are designated in the drawing $a1$, $a2$ etc., act similarly to the ribs $a$ in the plate according to Figs. 1–3 as contacting or supporting points.

It is preferable to compose the wire structure of insulated conductors, and in this connection lacquered wires are particularly suitable for the said purpose. The extremely thin insulating layer constitutes a good dielectric, both electrically as well as mechanically. For the purpose of causing electrical contact between the insulated conductor, the ends thereof, with the insulating substance removed, are connected to a metal ring.

Experiments have shown that the size of the surface divisions of a membrane influences the self-frequency thereof, and by suitable dimensioning of their spacial relation it is accordingly possible to accord the individual areas of the membrane different self-frequencies.

What I claim as new and desire to secure by Letters Patent is:

1. An acoustic device comprising a supporting plate having a plurality of perforations, a dielectric coating on said plate, and a conducting membrane disposed on said plate, said perforations exposing limited areas of said conducting membrane to permit unrestrained vibrations thereof.

2. An acoustic device comprising a supporting plate having a plurality of concave depressions therein forming cross ribs and terminating into apertures, a dielectric coating on said plate and a conducting membrane disposed on said cross ribs, said concave depressions exposing limited areas of said conducting membrane to permit unrestrained vibrations thereof.

3. An acoustic device comprising a supporting plate having a plurality of concave depressions therein forming cross ribs, each of said depressions terminating into apertures, a conducting membrane, and a dielectric disposed between said conducting membrane and said cross ribs, said concave depressions exposing limited areas of said conducting membrane to permit unrestrained vibrations thereof.

4. An acoustic device comprising a supporting plate having a plurality of juxtaposed shallow rectangular shaped depressions with flat sloping sides terminating into apertures, said juxtaposed rectangular shaped depressions forming cross ribs, a dielectric coating on said plate and a conducting membrane disposed on said cross ribs, said depressions exposing limited areas of said conducting membrane to permit unrestrained vibrations thereof.

5. An acoustic device comprising a supporting plate having a plurality of juxtaposed shallow rectangular-shaped depressions with flat sloping sides terminating into apertures, said juxtaposed rectangular shaped depressions forming cross ribs, a dielectric coating of lacquer on said plate and a conducting membrane disposed on said cross ribs, said depressions exposing limited areas of said conducting membrane to permit unrestrained vibrations thereof.

6. An acoustic device comprising a supporting plate having a plurality of juxtaposed shallow depressions with sloping sides, said depressions having venting apertures therein, and being arranged to provide supporting ribs extending across said supporting plate, and said plate being coated with insulating material, a dielectric diaphragm mounted on said supporting plate and having its inner side electrically separated therefrom by said coating, and a flexible conducting coating on the outer side of said diaphragm.

7. An acoustic device comprising a pair of electrodes and an interposed dielectric, one of said electrodes being relatively stationary and having an uneven surface provided with vents, and coated with insulating material, the other of said electrodes and said dielectric being portions of a flexible diaphragm contacting with said stationary insulated electrode.

8. An acoustic device comprising a pair of electrodes and an interposed dielectric, one of said electrodes being relatively stationary and having an uneven surface provided with vents, and coated with insulating material, the other of said electrodes being a coating of flexible conducting material on one side of a flexible diaphragm mounted on said stationary electrode.

9. An acoustic device comprising a stationary vented electrode coated with insulating material, and a dielectric diaphragm maintained in contact therewith, said diaphragm having a coating of conducting material thereon on the side opposite said stationary electrode.

10. An acoustic device comprising a supporting plate having a plurality of juxtaposed shallow depressions with sloping sides, said depressions having venting apertures therein, and being arranged to provide linear supporting ribs extending across said supporting plate, and having a coating of insulating material on one face thereof, a flexible dielectric diaphragm mounted with its inner side upon the coated face of said supporting plate, and a coating of conducting material on the outer side of said diaphragm.

In testimony whereof I have affixed my signature.

ERNST KLAR.